March 17, 1942.  G. COURTNEY  2,276,372
GLAMOR GLASSES
Filed April 15, 1940
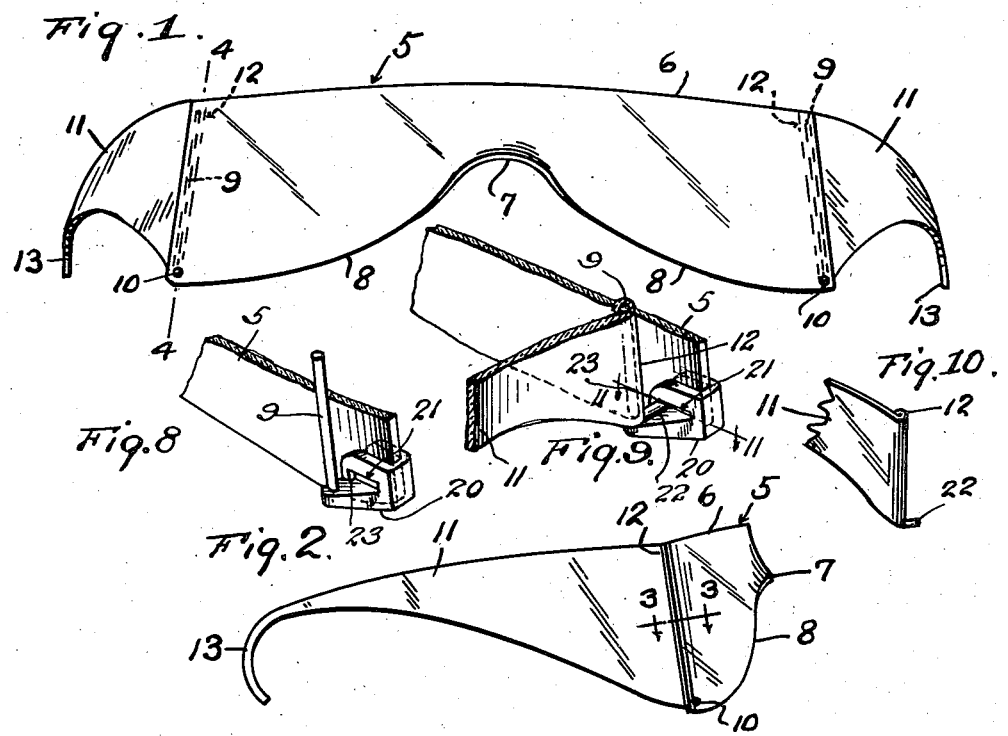
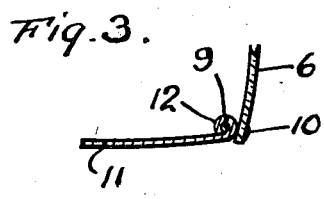
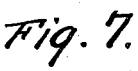
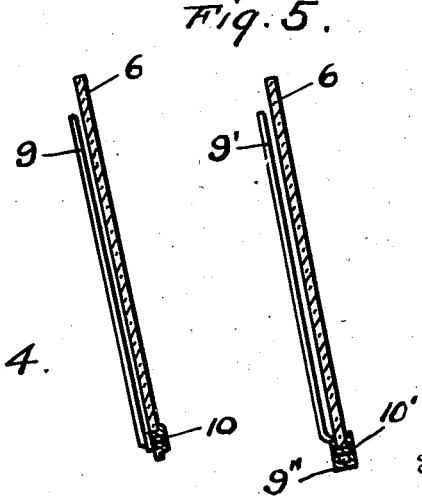
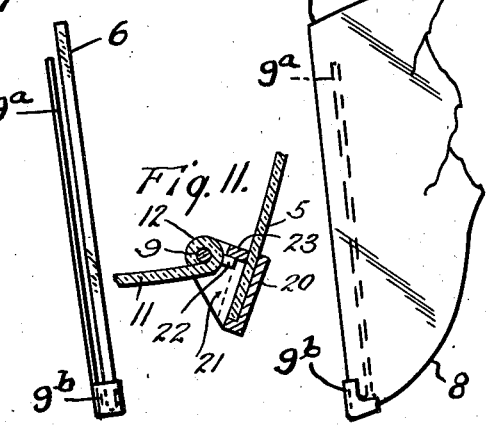
Inventor
Gerald Courtney
By L. B. James
Attorney Patented Mar. 17, 1942

2,276,372

UNITED STATES PATENT OFFICE 2,276,372

GLAMOR GLASSES

Gerald Courtney, Hollywood, Calif.

Application April 15, 1940, Serial No. 329,825

2 Claims. (Cl. 2—12)

This invention relates to the official class of optics and more particularly eye-glasses and eye-shades.

The primary object of this invention resides in the provision of eye-glasses and the like adapted to promote the glamor of individuals' appearances.

Another object of this invention resides in the provision of eye-glasses and the like adapted to govern the glamor of individuals' appearances by harmonizing or deharmonizing the same with the styles of garments worn by individuals.

A further object of this invention resides in the provision of eye-glasses or the like of such construction that glamorization in styles of garments worn by individuals can be varied by substitution of certain elements thereof for other similar elements.

A still further object of this invention resides in the provision of eye-glasses or the like consisting of certain elements adapted to be assembled in producing various color schemes so as to obtain glamor effects suited to different types of individuals.

With these and other objects in view, the invention consists in general of certain novel details of construction and combination of parts hereinafter fully described, illustrated in the accompanying drawing and particularly pointed out in the appended claims.

In the accompanying drawing like characters of reference indicate like parts in the several views, and:

Fig. 1 is a front elevation of the invention.

Fig. 2 is a side elevation thereof.

Fig. 3 is a fragmentary section on the line 3—3 of Fig. 2.

Fig. 4 is an enlarged section on the line 4—4 of Fig. 1.

Fig. 5 is a section similar to Fig. 4 but showing a modified construction.

Fig. 6 is a fragmentary perspective view showing the modification of Fig. 7 from the front.

Fig. 7 is an edge view showing a second modification.

Fig. 8 is a detailed perspective view of a further modified construction showing one side of the body portion with the temple removed.

Fig. 9 is a similar view showing the temple in operative position thereon.

Fig. 10 is a detail perspective view of the pivotal end of the temples shown in Figs. 8 and 9.

Fig. 11 is an enlarged sectional view approximately on line 10 of Fig. 9.

This invention includes a central or body portion indicated in general at 5 and a pair of temples 11. The body portion 5 is formed of a suitable transparent material such as glass, Celluloid, a transparent synthetic resin or other suitable material. This portion 5 has a convexly curved upper edge 6 and centrally of its lower edge there is provided a nose rest 7 which is formed at the lower edge of a forwardly curved portion of the body 5. The nose rest 7 is convexly curved and from the ends of the curve forming the nose rest the bottom edge of the body is formed by two convexly curved portions 8 extending in opposite directions from the nose rest. It will be seen that the edge portions 8 diverge from the edge 6 at each side of the body so as to afford ample means for covering the wearer's eyes. The ends of the body are formed with straight edges connecting the outer extremities of the edges 6 and 8.

Each of the temples 11 is provided at its forward edge with a straight tubular bead 12 and tapers from this bead to a thin ear hook 13 at its rear end. The temples 11 are preferably made of thin sheet Celluloid, synthetic resin or the like.

In the form shown in Figs. 1 to 4 an internally threaded sleeve 12 is fitted through each lower corner of the body 5 and opens rearwardly to receive the forwardly extending and threaded lower end of a pivot pin 9 which extends upwardly parallel to the body 10.

In the form shown in Fig. 5 each pin 9' is provided at its lower end with a forwardly offset flattened portion 9" bent to U-shape to receive the lower edges 8 of the body 5. A screw 10' secures each portion 9" in place.

In the form of the invention shown in Figs. 6 and 7 each pin 9a is provided at its lower end with an angular pocket 9b receiving one of the lower corners of the body 5 and secured thereon by cement or other suitable means.

The sleeves or beads 12 are slid over the pins 9 and thus serve to pivotally connect the temples and body.

It will be observed that this construction permits easy assembly and separation of the temple and body. The temples and body may be of any color or colors desired and by reason of the interchangeable construction a variety of different colored temples and body portions may be used to produce different color combinations matching with or in contrast to the wearer's complection and hair and the apparel and ornaments worn. It will be noted that the fastening means such as 10, 10' or 9b may be covered to form a "beauty spot" being finished in black or some desirable color. By this arrangement the device enhances the beauty of the wearer and does not detract from her appearance.

There has thus been provided a simple and efficient device of the kind described and for the purposes set forth.

It is obvious that changes may be made in the form and construction of the invention without departing from the principles involved. It is not therefore desired to confine the invention to the exact form herein shown and described but it is desired to include all forms which come within the scope of the appended claims.

In the form shown in Figs. 8, 9 and 10, the pin 9 is secured to a clamp 20 which is in turn secured to the outer lower ends of body 5 in any suitable manner, said clamp is provided with a groove 21 adapted to receive a lug 22 on the tubular bead 12 of the temple so as to retain the temple on the pin 9 and limit its movement by a stop 23 therein.

What I claim and desire to protect by Letters Patent is:

1. In a device of the character described, a body having upper and lower edges and end edges intersecting ends of the lower edges to provide lower corners for the body, brackets mounted at the lower corners of said body with portions extending rearwardly thereof, pins extending upwardly from the bracket back of ends of the body and terminating adjacent the upper edge thereof, said brackets having their rearwardly extending portions formed with pockets located in front of the pins and open at their outer sides, temples having forward ends of a height substantially corresponding to the height of the pins, said temples having vertical sleeves at their front ends slid downwardly into place about the pins to mount the temples for swinging movement outwardly from a folded position back of the body to a rearwardly extending position at ends of the body for use, and fingers extending laterally from lower ends of said sleeves into said pockets between upper and lower walls thereof to hold the sleeves in place about the pins and limit outward swinging of the temples by abutting engagement with inner ends of the pockets.

2. In a device of the character described, a body having upper and lower edges and end edges intersecting the lower edges to provide lower corners for the body, brackets mounted at the lower corners of said body with portions extending rearwardly thereof, pins carried by the rearwardly extending portions of the brackets and extending upwardly back of the body and terminating adjacent the upper edge thereof, and temples having their front ends of a height substantially corresponding to height of the pins and formed with vertical sleeves slid downwardly into place about the pins to mount the temples for swinging movement outwardly from a folded position back of the body to a rearwardly extending position at ends of the body for use.

GERALD COURTNEY.